(12) United States Patent
Auth et al.

(10) Patent No.: US 7,596,879 B2
(45) Date of Patent: Oct. 6, 2009

(54) GAPPING SYSTEM FOR DUAL-BLADE TRIMMER

(75) Inventors: Karl Jürgen Auth, Duisburg (DE);
Dieter Baukloh, Duisburg (DE);
Andreas Noé, Kerken (DE)

(73) Assignee: BWG Bergwerk- und Walzwerk-Maschinenbau, Duisburg (DE)

( * ) Notice: Subject to any disclaimer, the term of this patent is extended or adjusted under 35 U.S.C. 154(b) by 8 days.

(21) Appl. No.: 12/052,774

(22) Filed: Mar. 21, 2008

(65) Prior Publication Data

US 2008/0229599 A1 Sep. 25, 2008

(30) Foreign Application Priority Data

Mar. 21, 2007 (DE) .................... 10 2007 013 455

(51) Int. Cl.
*B27G 23/00* (2006.01)
(52) U.S. Cl. .................. 33/628; 83/508.2
(58) Field of Classification Search .......... 33/613, 33/645, 626, 628, 630; 30/265; 83/469, 83/508.2, 508.3
See application file for complete search history.

(56) References Cited

U.S. PATENT DOCUMENTS

| 4,420,996 | A  | * | 12/1983 | Greding et al. ............. 83/508.3 |
| 5,299,609 | A  | * | 4/1994  | Wedler ......................... 33/628 |
| 7,245,199 | B1 | * | 7/2007  | Reilly .......................... 33/640 |
| 2002/0092370 | A1 | * | 7/2002 | Pawelek et al. ............... 33/626 |
| 2009/0126549 | A1 | * | 5/2009 | Dietz et al. .................... 83/817 |

FOREIGN PATENT DOCUMENTS

| DE | 6608093 | 4/1968 |
| DE | 3125476 | 6/1981 |
| DE | 3203039 | 8/1982 |
| DE | 3428948 | 3/1985 |

* cited by examiner

*Primary Examiner*—G. Bradley Bennett
(74) *Attorney, Agent, or Firm*—Andrew Wilford

(57) ABSTRACT

In combination with a cutting apparatus having a pair of blades with edges that are closely juxtaposed relative to an axis with each other and where at least one of the blades is movable along the axis to set between axially confronting faces of the blades at the edges a predetermined gap, a system for measuring the gap has a stationary support, and respective means associated with each of the blades for measuring a distance between the support and the face of the respective blade.

18 Claims, 4 Drawing Sheets

GAPPING SYSTEM FOR DUAL-BLADE TRIMMER

FIELD OF THE INVENTION

The present invention relates to dual-blade cutting apparatus. More particularly this invention concerns a gapping method and apparatus for a dual-blade cutter for splitting or trimming metal plate or, preferably, metal strip passing continuously through the apparatus.

BACKGROUND OF THE INVENTION

In many production operations, for instance the production of metal strip or plate, it is necessary to cut or split the metal strip or plates, in particular to trim the longitudinal edges of metal strip or plates. The apparatus for doing this can be trimming shears having at least two rotating circular blades. Normally, a trimmer has at least one trimming head or set of trimming shears on each side of the strip. This is because metal strip or metal plate is produced with somewhat ragged edges and then is trimmed so as to achieve a constant predefined strip or plate width and to remove the uneven strip or plate edges. Trimming metal strip is frequently done in processing lines in a continuous process with trimming heads provided on both sides of the strip. The trimming heads or trimming shears have circular blades rotated about parallel horizontal axes extending horizontally transversely to the strip and its longitudinal travel direction. At least one of the blades of each trimmer is movable axially and transversely of the strip in order to set the strip width.

The cutting gap of the circular blade pairs and the blade overlap of the lower blade and upper blade, or upper blade and lower blade, of the trimming heads can be adjusted so as to minimize cutting burr and to extend the service life of the blades. It is important to generate the smallest possible cutting burr at the strip edge. The cutting burr is determined to a significant degree by the size of the cutting gap. Within the scope of the invention, the cutting gap refers to the distance between the blades in the strip plane, and thus normally to the horizontal cutting gap or the cutting gap in the axial direction, that is measured parallel to the rotation axes of the blades. The influence of the vertical overlap on quality or the size of the cutting burr has only a limited effect. The precise adjustment of the cutting gap or determination of the cutting gap during fabrication and processing of strip is thus of particular importance. However, the invention relates not only to trimmers but also other cutting apparatuses, e.g. cross-cutting shears.

Basically, it is known from practice to determine the cutting gap by measurement. In the heretofore known embodiment, one blade is mounted and horizontally fixed, while the other is horizontally adjustable, presuming of course that the strip is advanced horizontally perpendicular to a vertical plane or planes including the blade rotation axes. The position of the adjustable blade is measured, for example, using encoders. For purposes of calibration, the blades are moved together just far enough so that they just barely touch. This position of the encoder is stored and defined as the zero position for the cutting gap.

A disadvantage of the known procedure is that calibration of the cutting gap is done in part manually, and the assessment as to when the blades are just touching is subject to a certain degree of subjectivity. In addition, the calibration procedure takes a relatively long period of time. Furthermore, the cutting gap is not measured directly but from a certain distance due to design constraints. This aspect is particularly problematic when the machine is cool or at ambient temperature at the start of production, then heats up during production. The entire machine thus undergoes thermal expansion, thereby in turn affecting the cutting gap. In practice, it is thus necessary to recalibrate the machine several times as the machine heats up. If this is not done, the strip produced has highly variable quality in regard to the strip edge.

OBJECTS OF THE INVENTION

It is therefore an object of the present invention to provide an improved gapping system for a dual-blade cutter or trimmer.

Another object is the provision of such an improved gapping system for a dual-blade cutter or trimmer that overcomes the above-given disadvantages, in particular that enables error-free determination and calibration of the cutting gap.

A further object of the invention is to provide a method of determining the cutting gap by means of this type of apparatus.

SUMMARY OF THE INVENTION

In combination with a cutting apparatus having a pair of blades with edges that are closely juxtaposed relative to an axis with each other and where at least one of the blades is movable along the axis to set between axially confronting faces of the blades at the edges a predetermined gap, a system for measuring the gap has according to the invention a stationary support, and respective means associated with each of the blades for measuring a distance between the support and the face of the respective blade.

In other words, this objects is attained in that at least one position-measuring device or displacement-measuring device is associated with each of the lower and upper blades for purposes of determining the cutting gap. In this regard, the cutting gap is adjustable by positioning the lower blade and/or the upper blade. Preferably, the cutting apparatus is constituted as trimming shears having at least two rotating circular blades. However, the invention also comprises cutting apparatuses that are constituted as cross-cutting shears for cross-cutting or slitting strip, and that for this purpose have two "guillotine-like" straight cutting blades.

The invention is based on the recognition that an especially precise determination, and thus calibration, of the cutting gap can be effected if the position not only of one but rather of both blades can be measured or acquired by technical measuring means, after which the cutting gap is calculated by subtraction. The position-measuring devices here can consist of contact-type measuring devices, for example, measuring pins or probes and/or contact-free measuring devices, for example, lasers. These preferably work directly on a measuring surface so that the physical position of both blades is measured directly. This measuring surface consists either of the face of a blade itself or a contact surface of a blade holder associated with the face. During measurement using, for example, a measuring probe, the measuring probe is thus pressed directly against the respective measuring surface and the cutting gap is then determined precisely by subtraction based on the measured values associated with the two blades. This provides an automatic objective calibration extremely quickly. This is because based on the measured cutting gap, a change can obviously be effected in the cutting gap back to the desired value. This can be achieved by means of an automatic control process working with or without feedback. Calibration is done every a few seconds. This means that recalibration can be easily implemented many times even during the warm-up phase for the machine.

In a preferred embodiment, the lower blade and upper blade are retained in a manner known per se in a blade holder that is rotated. A separate measuring device, for example, a measuring probe is associated with each blade, the probe being retained in a "fixed" manner on a machine frame, for example, and thus not rotating along with the blade or blade holder. The two measuring probes are preferably provided on the same side of the blades, for example, on the drive side of the cutting apparatus. In this case, it is useful if the blade holder and/or the blade has at least one measuring hole that opens toward the respective measuring surface, that is, either the face of the blade itself or a corresponding contact surface of the blade holder. As a result, during measurement the measuring probe can be inserted into the respective measuring hole or passed through the measuring holes to the respective measuring surface.

What is preferred in particular is an embodiment of the invention in which an opening is provided in the region of one blade only in the region of the blade holder, the opening directly confronting the face of the blade. With the other blade, it is then useful if on the one hand the blade holder has a measuring hole and on the other hand the blade has an aligned measuring hole, with the result that these two aligned measuring holes then are aligned with and confront a contact surface of the blade holder associated with the blade. This ensures that the measuring devices or measuring probes work on the circular blades from the same direction, for example, from the drive side.

In addition, the invention proposes that the blade holder have at least one holding jaw each on side of the blade, such that a blade is fixable in an essentially replaceable manner between its two holding jaws. It is useful in this regard if at least one of the two holding jaws, specifically, the holding jaw facing the measuring device, has a measuring hole or opening passing completely through the holding jaw. This measuring hole passing through the holding jaw can, for example, directly open at the face of the respective blade. In addition, it is also possible to align this opening of the holding jaw with a corresponding opening of the blade such that these two openings then meet a corresponding contact surface, in the manner already described, that constitutes the measuring surface. It is always possible for the measuring device, for example, the measuring probe, to contact the respective applicable measuring surface through the holes or openings, and in this way to precisely determine the position.

Another proposal of the invention provides that a plurality of measuring holes, for example, two to five blade holes, be associated with each blade, for example, the upper blade and lower blade. These can be angularly equispaced on the blade, with the result that in a preferred embodiment a position measurement becomes possible at several angularly offset positions of the blade, thereby enabling any flatness errors of the blade faces to be determined and compensated for.

In a preferred embodiment, the measuring device has a movable measuring pin or measuring probe that during measurement passes through the measuring holes and contacts the respective measuring surface. To this end, this measuring pin can be movable by means of an actuator on a movable holder. This actuator can, for example, be constituted as a pneumatic cylinder-piston system. The measuring probe can be turned on and off by an appropriate pneumatic valve. The end positions of the measuring probes are monitored or analyzed within the measuring device, for example, by a contactless proximity switch. It is of course understood that within the scope of the invention an appropriate automatic control apparatus can be provided that positions the measuring devices and analyzes the positions determined, and thus calculates the cutting gap based on the positions determined. In addition, this automatic control apparatus can be linked to the actuators that adjust the blade position(s). All in all, the gap can not only be measured, it can also be precisely adjusted or calibrated.

According to the method of this invention, which is preferably implemented using an apparatus of the type described above, that is where the cutting apparatus has a lower blade and a upper blade that are spaced apart (along the strip plane or horizontally) by a distance forming the cutting gap, both the position of the lower blade as well as the position of the upper blade are measured, that the cutting gap is determined or calculated based on these measurements by subtraction. To do the calculations, an appropriate computer can be proved that can also be integrated into an automatic control means. This apparatus can also of position the blades and thus adjust the gap.

It is also within the scope of the invention that the position of the blades be determined by a contact-type approach, for example, by a measuring pin or measuring probe. However, the invention also comprises embodiments in which the position is measured by a contactless approach, for example, using a laser.

What is proposed in particular in connection with an apparatus of the type described is that measurement of the positions of the lower and/or upper blade is done when the blades are stationary. This is because the measuring devices are preferably fixed in the frame or housing of the trimmer or cross-cutting apparatus, that is, they do not rotate along with the blades or blade holders. Since measurement is preferably effected in the manner described through appropriate holes or openings in the blade holder, it is useful to do the position measurement with the blades stationary so that the blades can be appropriately moved to a position in which the respective measuring devices can act through the axially inwardly open hole(es) on the measuring surfaces. It is useful in this regard if measurement is effected not only within a single region of the blade but for different angularly offset positions of the blade, and thus in different angular regions of the blade. This approach enables any flatness errors of the blade faces to be detected and compensated for. Measurement can be effected for one blade, for example, using one measuring device at different angular positions of the blade. However, the invention also comprises embodiments in which a plurality of measuring devices are associated with one blade, the devices being able to measure a plurality of angular regions of the blade simultaneously.

Finally, the subject matter of the invention is also a method of trimming or cross-cutting strip, metal plates, or the like, comprising a trimmer, cross-cutting shears, or an analogous cutting apparatus, the cutting gap being determined using a method of the type described before, during, and/or after trimming or cross-cutting. The measuring method according to the invention is thus preferably integrated into a production or machining process so that the cutting gap can be determined during trimming or also cross-cutting at the appropriate time.

The cutting gap optimally measures around 5% of the strip thickness for soft materials and up to around 20% of the thickness for hard materials. In the case of strip with a thickness of, for example, 0.1 mm or 100 µm, the optimum cutting gap is thus around 5 µm to 20 µm, depending on the material.

The invention reliably ensures that the optimum cutting gap can be adjusted with high precision.

BRIEF DESCRIPTION OF THE DRAWING

The above and other objects, features, and advantages will become more readily apparent from the following description, reference being made to the accompanying drawing in which:

FIG. 1A is a large scale view of a detail of FIG. 1

SPECIFIC DESCRIPTION

Figure 1:
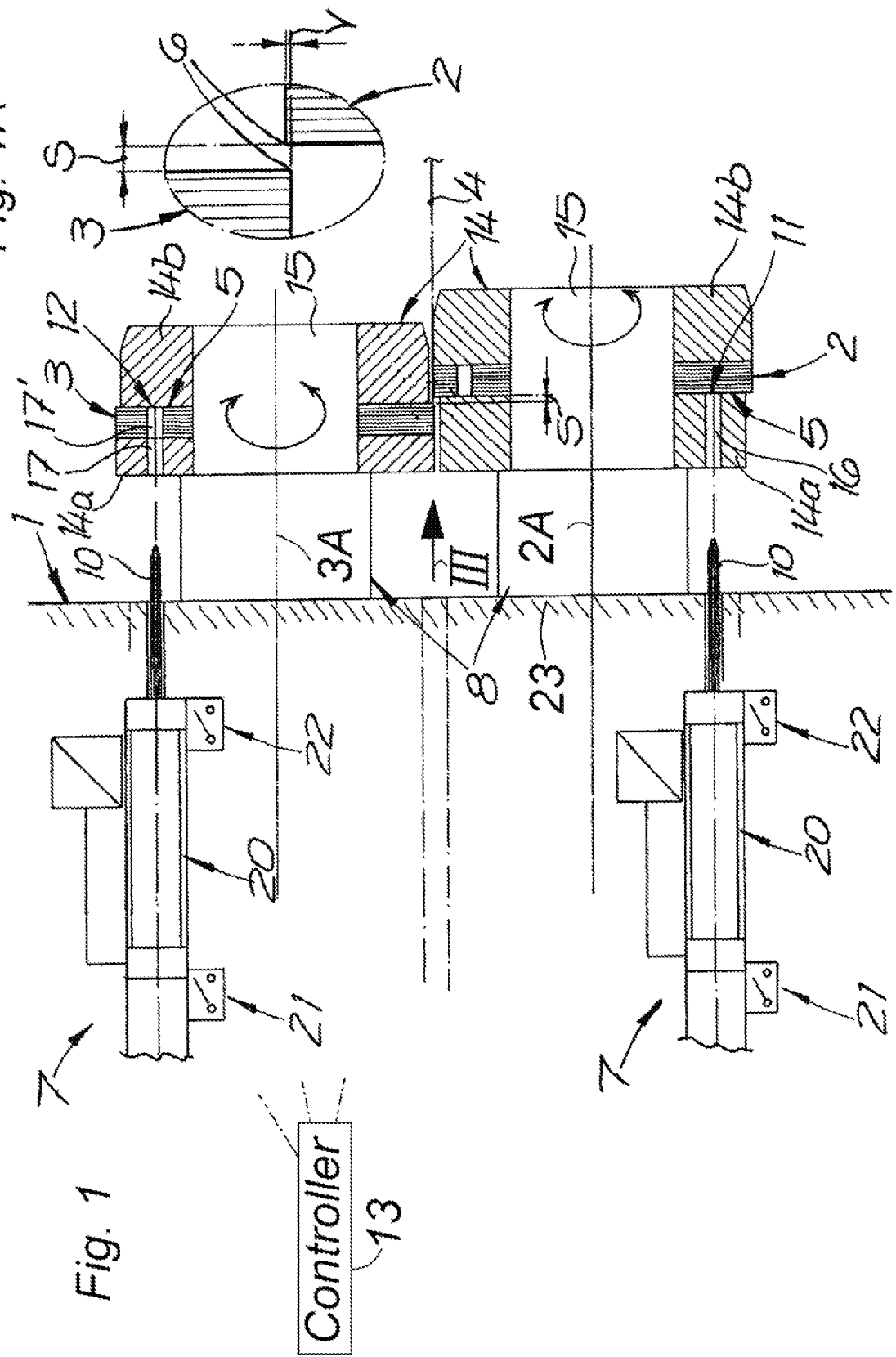
FIG. 1 is a party diagrammatic sectional view through a trimmer according to the invention.

The drawing shows an apparatus for trimming metal strip and comprising a cutting apparatus or trimmer 1 having a lower blade 2 and an upper blade 3 rotatable about respective parallel and horizontal axes 2A and 2B extending perpendicular to a travel direction D of a workpiece, here a continuous horizontally advancing metal plate or strip, indicated schematically at 4. The blades 2 and 3 here are identical annular disks. The metal strip 4 to be trimmed is shown only diagrammatically. The upper blade 3 and the lower blade 2 are spaced apart along a plane of the workpiece 4, and thus in the embodiment horizontally by a distance forming a cutting gap S.

Planar, parallel, and confronting faces 5 of the blades 2 and 3 form the cutting surfaces and the corresponding cutting edges 6. FIG. 1A shows the two blades 2 and 3 can be mounted relative to each other with a vertical overlap V. The size of this vertical overlap V, which can be either positive or negative, is of secondary significance within the scope of the invention, however. According to the invention a respective position-measuring device 7 is associated with the lower blade 2 and with the upper blade 3 to determine the size of the cutting gap S. Thus, both a measurement of the position of both the lower blade 2 and of the position of the upper blade 3 relative to a fixed position on a machine frame 23 can be carried out, and the cutting gap S can be determined by subtraction of the smaller measurement from the larger measurement.

Each of the blades 2 and 3 has its own rotary drive 8 that rotationally drives the respective blade 2 or 3. In addition, it is possible to adjust the axial or horizontal position of the two blades 2 and 3, or also only of one of them, by means of a respective actuator indicated 9. The actuator is shown only schematically in the drawing. The desired cutting gap S can be adjusted by appropriate positioning. At the same time, it is possible for either of the two the blades 2 and 3 to be adjustable separately. However, the invention also comprises embodiments in which one blade is axially fixed, while only the other blade is movable axially, that is parallel to its axis 2A or 3A of rotation, which itself is perpendicular to the plane of its blade face. However, even with this embodiment it is useful to provide a separate measuring device 7 both for the movable blade as well as the nonmovable blade in order to determine the cutting gap S precisely in the manner specified by the invention.

As indicated in FIG. 1, the two position-measuring devices 7 are fixed on the frame 23 of the trimmer 1, that is they do not rotate along with the blades 2 and 3. The measuring devices 7 here in the embodiment are constituted as contact-type measurers 7, specifically, as measuring probes with contact pins 10. According to the invention, each of these measuring devices 7 acts on a respective planar surface 11 or 12 that corresponds to the axial position of cutting face of the respective blade 2 or 3. In the case of the measuring surface 11 for the lower blade 2 is, for example, it is the actual face 5 of the blade 2 itself. In the case of the upper blade 3, it is not the face 5 of the blade 3 itself that functions as measuring surface, but instead a planar contact face 13 of a blade holder 14 against which the face 5 of the blade 3 is clamped. This enables the two measuring devices 7, as indicated in FIGS. 1 and 2, to be provided on the same side of the blades 2 and 3, specifically, on the drive side, and thus on the side of the blades 2 and 3 facing away from the metal strip 4.

Each of the blades 2 and 3 is held in a manner known per se by the respective blade holder 14 that is rotationally driven. Here each blade holder 14 has two holding jaws 14a and 14b that flank the respective blades 2 or 3, so that the blades 2 and 3 are clamped between the respective two holding jaws 14a and 14b. FIG. 1 further shows that the two holding jaws 14a and 14b of each of the jaws 2 and 3, as well as the blades 2 and 3 clamped axially between them, are mounted on and fixed to a respective blade shaft 15 that in turn is rotated by the respective drive motor 8.

Figure 2:
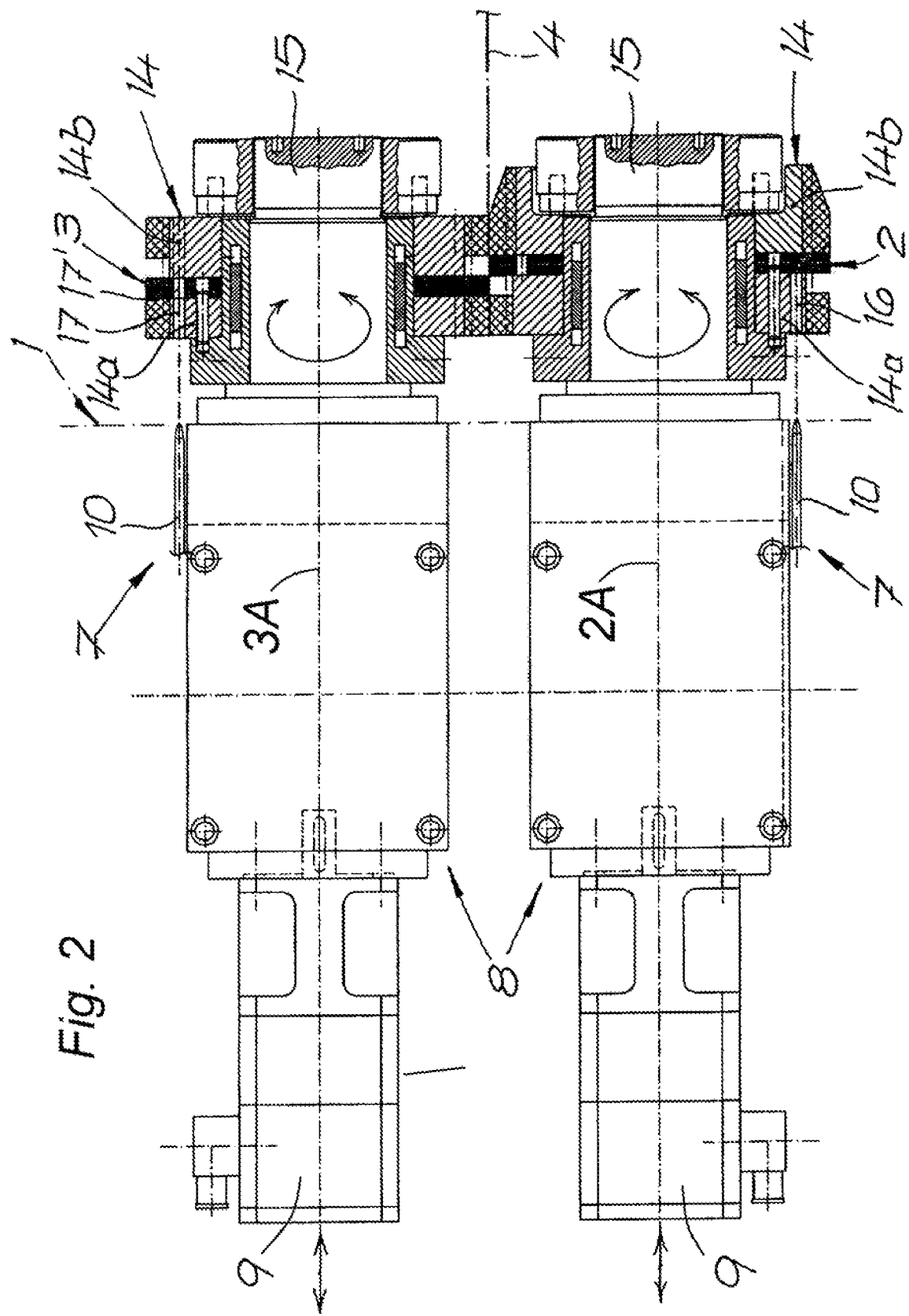
FIG. 2 is another view showing the structure of FIG. 1.

Here according to the invention as shown in FIGS. 1 and 2, a measuring hole 16 is formed for the one blade (the lower blade 2) only in the one holding jaw 14a of the blade holder 14, which hole completely passes through the holding jaw 14a as an opening or hole and then meets the respective face 5 of the lower blade 2. During measurement, the measuring pin 10 can pass through this measuring hole 15 directly to the face 5 of the lower blade 2, and thus engage the measuring surface 11, which is the blade face 5. This hole 16 is thus through the inner holding jaw 14a that is between the blade 2 and the respective measurer 7.

In order to ensure position measurement for the upper blade 3 in analogous fashion, what is provided here is not only a measuring hole 17 in the region of the respective holding jaw 14a, but in addition a measuring hole 17' in the blade 3 itself as well, this hole 17' being aligned axially with this measuring hole 17. As a result, the measuring pin 10 penetrates the aligned measuring holes 17 and 17' and for determining the position of the blade 3 determines the position of a the inner face 12 of the blade holder 14 that bears flatly against the blade 3 so it is coplanar with the face 5 of the blade 3. Thus here the measuring surface 12 is the inner face of the outer upper holding jaw 14b. Since the upper blade 3 is in flat surface contact with this surface 12 with its face 5, this contact surface 13 can essentially function as the reference surface or measuring surface 12.

Figure 3:
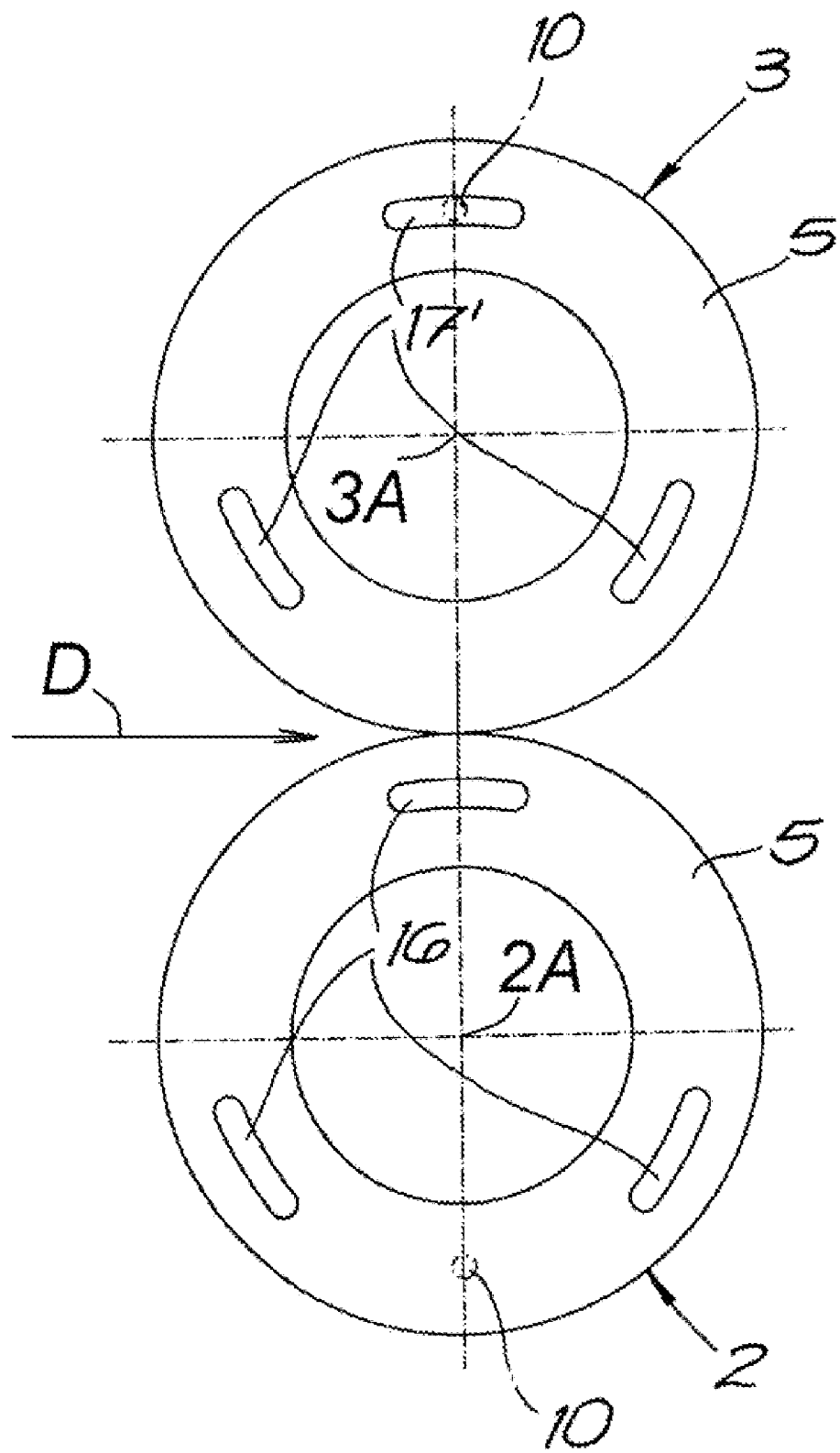
FIG. 3 is a view of the blade of the structure shown in FIG. 1 seen from the direction of the arrow III of FIG. 1.

In particular, FIG. 3 shows that in the region of the upper blade 3 and the lower blade 2 not there is not one but three angularly equispaced measuring holes 16, 17, and 17' formed as axially throughgoing and arcuate slots centered on the respective axis 2a. As a result, the blade position can be determined at various angular positions, thereby enabling any flatness errors of blade faces 5 to be compensated for.

It is useful in this regard to do the position measurement in the embodiment shown with the blades stationary since the measuring devices, specifically, the measuring probes 10, are nonrotatably fixed on the trimming head 1, while the blades 2 and 3 along with their blade holders 14 rotate when in operation. To determine the cutting gap S, it is thus recommended that the blades 2 and 3 be positioned in the desired manner or at the desired angular position so as to enable the measuring probe 10 to be inserted into the provided holes 16, 17, and 17'.

Figure 4:
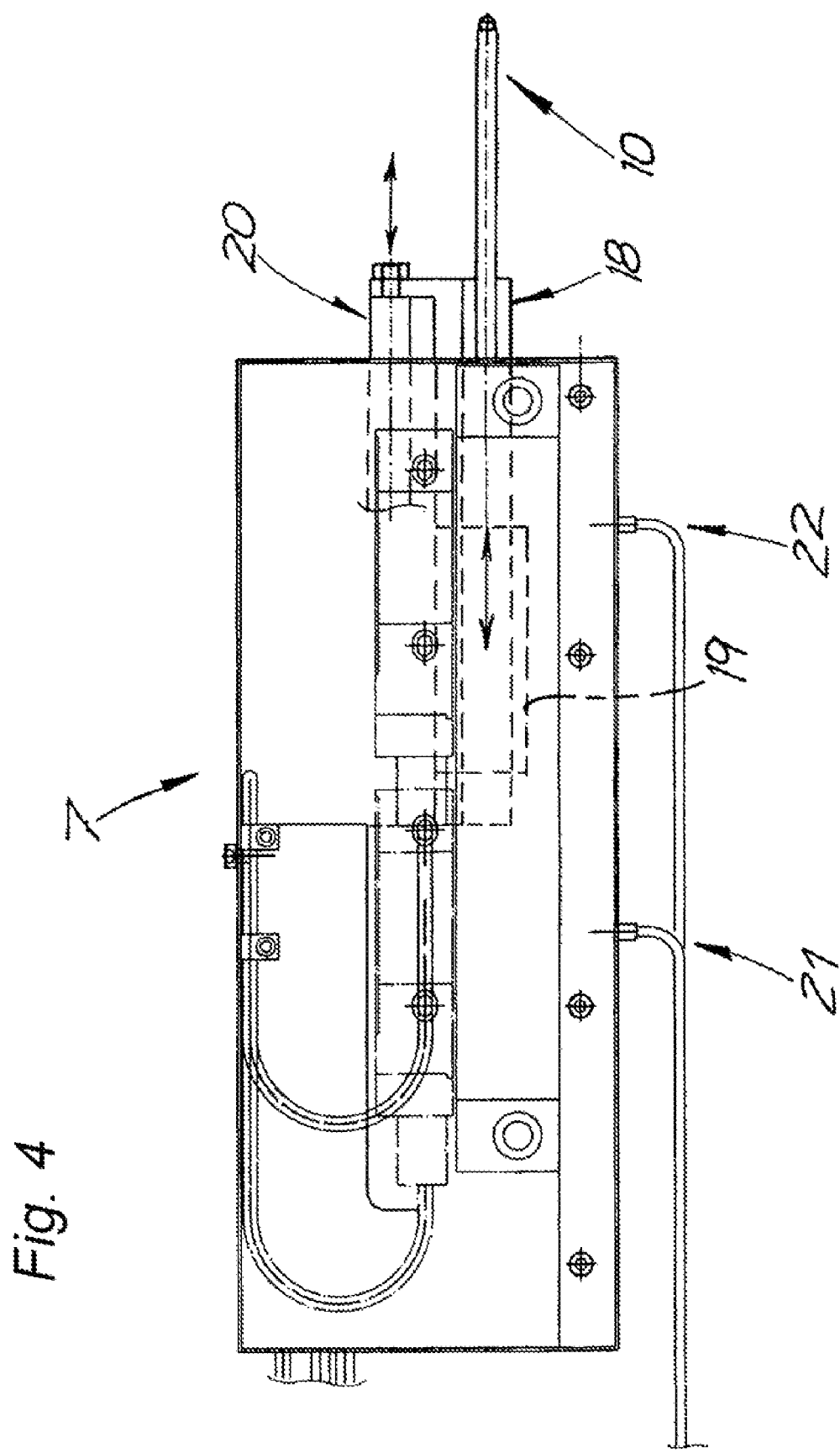
FIG. 4 shows a measuring device of the structure shown in FIG. 1.

FIG. 4 illustrates by way of example the design and functional principle of the measuring devices 7 or measuring probes 10 according to the invention. Measuring probes 10 are movable on a holder or support 18 on linear guides 19, specifically by means of a straight line actuator 20 that in the embodiment is constituted as a pneumatic cylinder-piston system. Position measurement is effected by two schematically shown analog proximity switches 21 and 22. According to the invention, not only can the cutting gap be determined, but usually a precise setting of a specified value is done that takes into account the measurement. This is supervised by a controller 13 that is connected to the actuators 9 and to the measurers 7, and that can hold set-point values for monitoring blade positions and calculating the gap, which is the difference between the two measurements that are taken.

Of course it is within the scope of the invention to use a contact-free measuring device, for instance a laser distance detector. In this case there would be no moving parts in the measurer 7, merely the contact-free sensor, but the system would otherwise work the same, with the holes 16, 17, 17' being aligned with the sensor for a measuring operation.

The embodiment describes the invention only for trimming strip and metal plates. However, the invention also comprises other splitting apparatuses or splitting techniques, for example cross-cutting of strip using cross-cutting shears. In this case, the cutting gap can also be determined at a plurality of sites on a blade, specifically, over the length of the blade, where the length of the blade refers to the length transverse to the direction of travel for the strip or plate.

We claim:

1. In combination with a cutting apparatus having a pair of blades with edges that are closely juxtaposed relative to an axis with each other and where at least one of the blades is movable along the axis to set between axially confronting faces of the blades at the edges a predetermined gap, a system for measuring the gap comprising:
   a stationary support; and
   respective means associated with each of the blades for measuring a distance between the support and the face of the respective blade.

2. The combination defined in claim 1 wherein both of the means are both carried on the support to one axial side of the blades.

3. The combination defined in claim 1 wherein the blades are straight blades of a cross-cutter.

4. A cutting apparatus comprising:
   a support;
   a pair of disk blades rotatable on the support about respective parallel axes and having axially confronting faces forming closely juxtaposed outer edges themselves forming a gap;
   means for rotating the blades about the respective axes;
   means for shifting one of the blades axially relative to the other of the blades;
   respective means carried on the support for measuring a distance from the support to the faces of the blades; and
   control means for calculating the difference between the measurements and thereby determining a size of the gap.

5. The apparatus defined in claim 4 wherein each of the measuring means each include:
   a probe shiftable axially on the support toward and away from the respective blade;
   an actuator for shifting the probe axially; and
   means for determining a position of the probe relative to the support.

6. The apparatus defined in claim 4 wherein the probe is a pin.

7. The apparatus defined in claim 3, further comprising:
   respective blade holders each including an inner and an outer jaw having respective outer and inner faces axially gripping each of the disk blades, the inner jaws being between the respective blades and the support, one of the inner jaws being formed with an axially throughgoing hole through which the respective measuring means can measure the distance from the support to the face of the respective blade, whereby the blade faces lie flatly against respective faces of the jaws.

8. The apparatus defined in claim 7 wherein the one inner jaw is formed with a plurality of such axially throughgoing holes.

9. The apparatus defined in claim 8 wherein the holes are angularly spaced about the one inner jaw.

10. The apparatus defined in claim 7 wherein the other inner jaw and the respective blade are both formed with axially aligned holes through which the respective measuring means can measure the distance from the support to the face of the respective blade by measuring the distance from the support to the inner face of the outer jaw.

11. The apparatus defined in claim 10 wherein the measuring means of the other jaw has a pin axially shiftable through the hole thereof and through the hole of the respective blade into contact with a face of the outer jaw of the respective blade.

12. A method of measuring a gap between confronting faces of blades of a cutting apparatus, the method comprising the steps of:
   measuring a distance from a support to one side of the blades to one of the faces;
   measuring a distance from the support to the other of the faces; and
   calculating the difference between the measured distances as the gap.

13. The method defined in claim 12 wherein the distances are measured without contacting the blade faces.

14. The method defined in claim 12 wherein the distances are measured by extending a probe from the support and engaging the probe the respective blade face or with structure coplanar with the respective blade face.

15. The method defined in claim 12 wherein the blades are disks that are rotated for cutting, the method further comprising the step of
   arresting the blades for the measuring operation.

16. The method defined in claim 12 wherein a plurality of measurements are taken for each blade at angularly offset positions thereon.

17. The method defined in claim 12 wherein the blades are each gripped between inner and outer faces of respective outer and inner blade-holding jaws of which the inner jaw is between the respective blade and the support, the measurement of the distance to one of the blades being made through the respective between an inner face thereof directed toward the support and the support and for the other of the blades through the respective inner jaw and through a hole in the respective blade to the inner face of the respective outer jaw.

18. The method defined in claim 12, further comprising the steps after determining the size of the cutting gap of:
   comparing the determined cutting-gap size with a set point; and
   axially shifting one of the blades to set the gap equal to the set point.

* * * * *